United States Patent [19]
Long

[11] Patent Number: 4,637,177
[45] Date of Patent: * Jan. 20, 1987

[54] MODULAR UNIT ADAPTED FOR OFFICE USE

[76] Inventor: Dennis L. Long, 2524 Santigo S.E., Grand Rapids, Mich. 49506

[*] Notice: The portion of the term of this patent subsequent to Feb. 11, 2003 has been disclaimed.

[21] Appl. No.: 793,717

[22] Filed: Oct. 30, 1985

Related U.S. Application Data

[63] Continuation of Ser. No. 569,298, Jan. 9, 1984, abandoned, which is a continuation-in-part of Ser. No. 518,480, Jul. 29, 1983, Pat. No. 4,511,024, which is a continuation-in-part of Ser. No. 538,513, Oct. 3, 1983, Pat. No. 4,569,163.

[51] Int. Cl.⁴ .................................................. A47B 5/04
[52] U.S. Cl. ..................................... 52/36; 160/229 R; 312/140.2; 312/258
[58] Field of Search ......................... 52/36; 160/229 R; 312/257 R, 256, 262, 263, 239, 140.2, 195, 282, 209, 250; 403/102

[56] References Cited

U.S. PATENT DOCUMENTS

| | | | |
|---|---|---|---|
| 786,670 | 4/1905 | Parker . | |
| 912,168 | 2/1909 | Reese | 312/282 |
| 1,003,780 | 9/1911 | Newrath | 403/102 |
| 1,133,866 | 3/1915 | Leighty . | |
| 1,244,497 | 10/1917 | Hammock . | |
| 1,408,731 | 3/1922 | Harris . | |
| 1,928,508 | 9/1933 | Spang | 52/36 |
| 1,928,936 | 10/1933 | Henricson | 312/195 |
| 2,185,513 | 1/1940 | Middleton . | |
| 2,344,149 | 3/1944 | Jory | 52/36 |
| 2,457,536 | 12/1948 | Doggett . | |
| 2,540,579 | 2/1951 | Hanner | 403/102 |
| 2,673,132 | 3/1954 | Alderman | 52/36 |
| 3,540,788 | 11/1970 | Lundquist . | |
| 3,748,010 | 7/1973 | Garte . | |
| 4,070,075 | 1/1978 | Morgan | 312/250 |
| 4,221,441 | 9/1980 | Bain . | |
| 4,290,659 | 9/1981 | Yoshiyuki . | |
| 4,338,990 | 7/1982 | Blodee et al. | 160/229 R |
| 4,373,761 | 2/1983 | Hansberry | 182/17 |
| 4,433,884 | 2/1984 | Edwards et al. | 312/209 |

FOREIGN PATENT DOCUMENTS 2113111 10/1972 Fed. Rep. of Germany .

Primary Examiner—Kenneth J. Dorner
Assistant Examiner—Joseph Falk
Attorney, Agent, or Firm—Ian C. McLeod

[57] ABSTRACT

A foldable modular unit (11) with cabinets (14) adapted for office use as described. The unit includes foldable panels (19 and 21) and is portable when folded.

10 Claims, 12 Drawing Figures

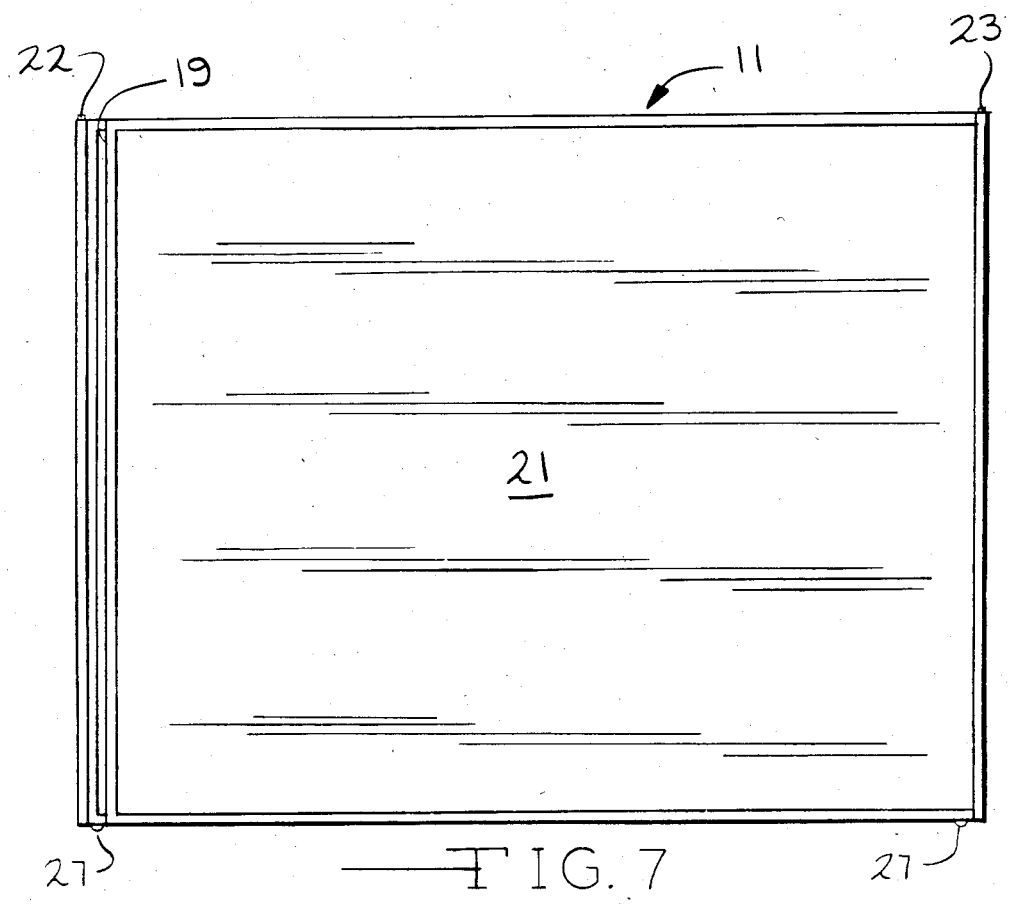
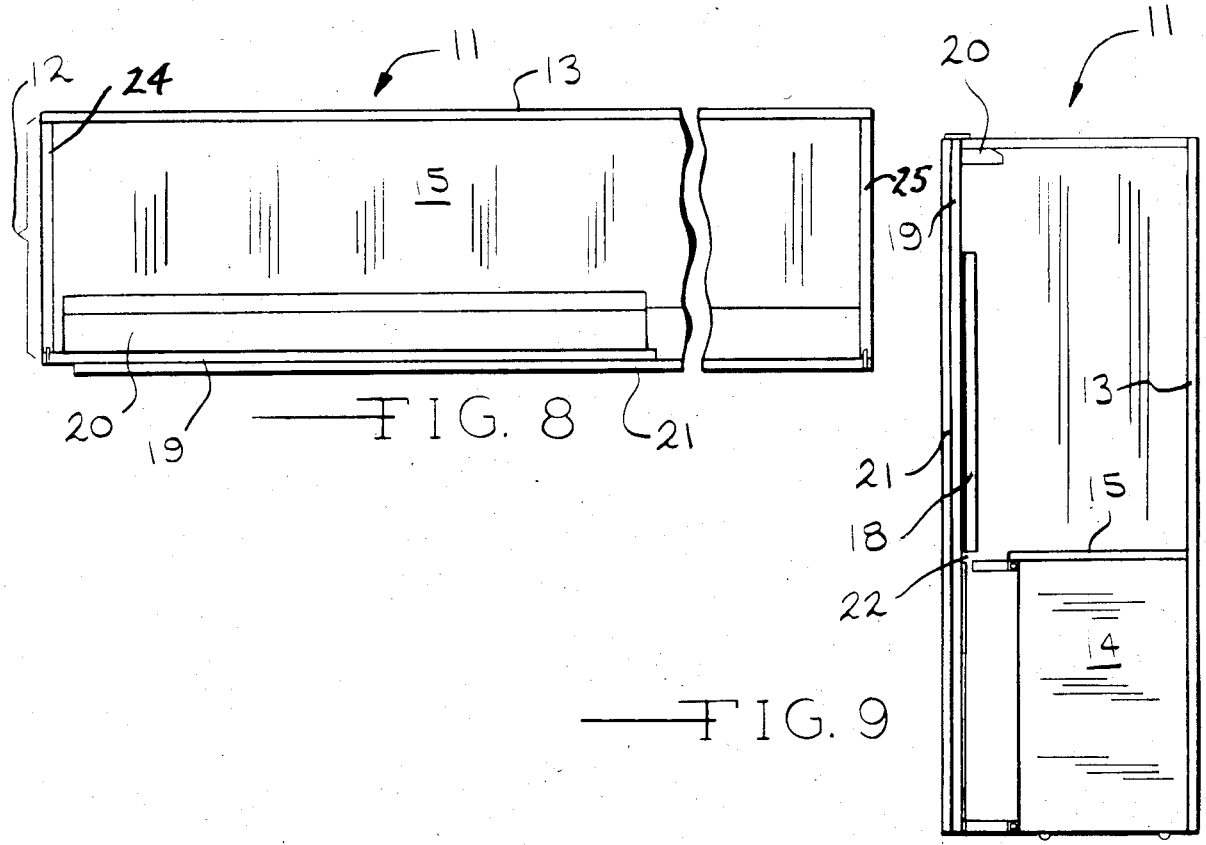

MODULAR UNIT ADAPTED FOR OFFICE USE

CROSS REFERENCE TO RELATED APPLICATION

This application is a continuation of application Ser. No. 569,298 filed Jan. 9, 1984, now abandoned, which is a continuation-in-part of application Ser. No. 518,480, filed July 29, 1983, now U.S. Pat. No. 4,511,024 and which is a continuation-in-part of application Ser. No. 538,513, filed Oct. 3, 1983 U.S. Pat. No. 4,569,163.

BACKGROUND OF THE INVENTION

1. Field of the Invention

The present invention relates to portable modular units adapted for office use including at least one foldable panel on a central divider and which have a cabinet and a foldable work surface. The units provide work stations and can be joined to similar units to form a system. When the panels are folded, the modular unit is portable for relocation.

2. Prior Art And Related Inventions

The prior art is described in U.S. Pat Nos. 786,670 to Parker; 1,133,866 to Leighty; 1,244,497 to Hammock; 1,408,731 to Harris; 2,185,513 to Middleton; 2,457,536 to Doggett et al; 3,540,788 to Lundquist; 3,748,010 to Garte; 4,221,441 to Bain and 4,290,659 to Yoshiyuki. Except for Garte, these patents describe units which are not designed to be modular so as to form a system of multiple units.

Garte describes in reference to FIG. 4 a cabinet structure with two fold down tables, one on each of two separate cabinets positioned together in a modular fashion. The tables are used for patient examinations. Such modular units are useful, but provide no privacy which is important in office settings.

In my application Ser. No. 518,480, I described a portable modular unit and system having a central divider particularly including a conveyor as the central divider and with foldable panels formed of tubular members to provide open panels. In my application Ser. No. 538,513, a modular unit and system is described which is particularly adapted for medical use.

OBJECTS

It is therefore an object of the present invention to provide a modular unit for office use which is adapted to form a system including several units and which has foldable panels which provide an enclosed work area providing privacy. It is further an object of the present invention to provide a modular unit which includes multiple typing support surfaces. These and other objects will become increasingly apparent by reference to the following description and the drawings.

IN THE DRAWINGS

FIG. 7 is a front view of the modular unit wherein the first and second panels (19 and 21) are closed.

FIG. 8 is a plan view of the modular unit as shown in FIG. 7.

FIG. 9 is an end of FIG. 8 with panel 25 removed showing the overlapping of the first and second panels (19 and 21).

GENERAL DESCRIPTION

Figure 1:
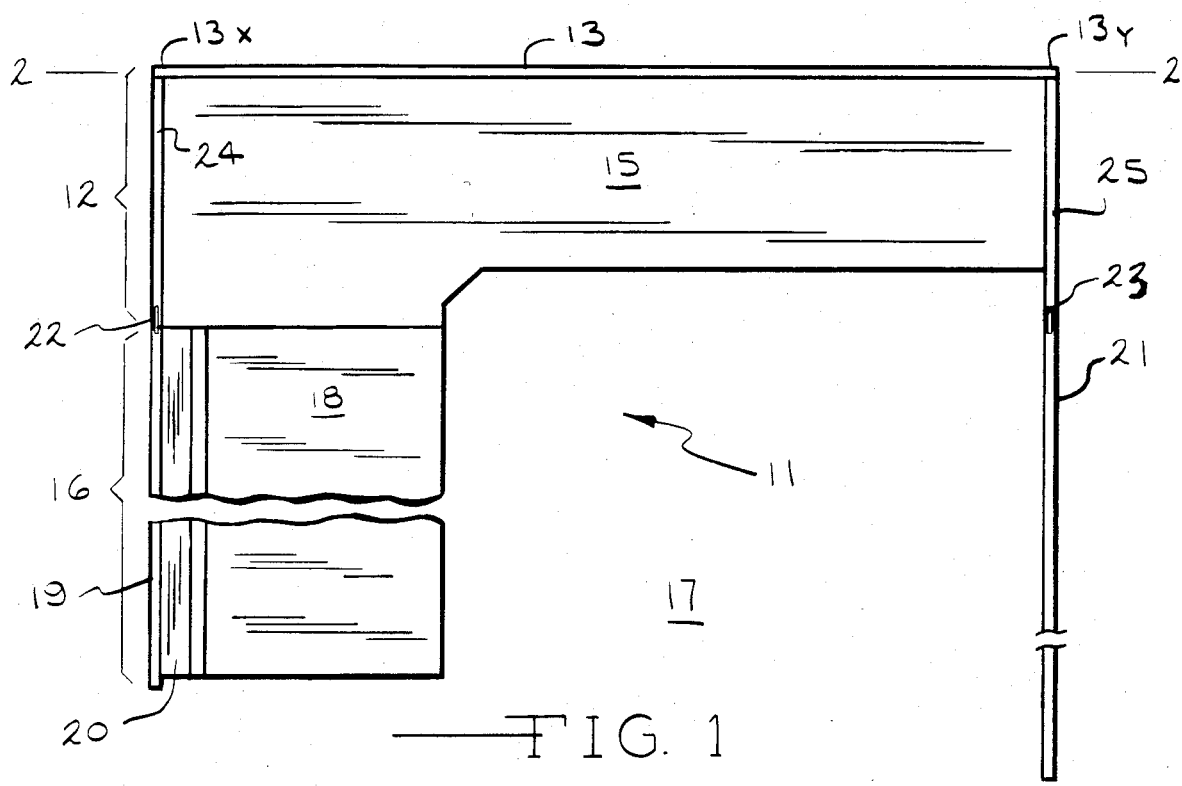
FIG. 1 is a plan view of a modular unit (11) in the unfolded position, particularly illustrating two foldable first and second panels (19 and 21).

The present invention relates to a portable and unfoldable modular unit (11) for office use to be joined to similar modular units for providing work stations (17) which comprises:

(a) a central divider (12) including a solid vertically oriented wall (13) having opposite ends (13x and 13y) and sides located between the ends and a top and a bottom, a cabinet structure (14) on at least one side of and adjacent to the bottom of the wall; and a horizontally oriented first work surface mounted on the cabinet at a level for typing use;

(b) a vertically oriented panel (19) mounted on the central divider by hinge means (45) so as to be unfoldable on a vertical axis into an open position at a 90° angle away from a line (2—2) between the ends of the central divider to provide the work station and so as to be foldable on the vertical axis parallel to the line between the ends; and (c) a second work surface (18) hingedly mounted on the panel so as to be foldable upward when the panel is folded and at a level for typing use when unfolded.

The present invention particularly relates to a portable and unfoldable modular unit (11) for typing use providing work stations (17) which comprises:

(a) a central divider (12) including a solid vertically oriented wall (13) having opposite ends (13x and 13y) and sides located between the ends and a top and a bottom, with a cabinet structure on one side of and adjacent to the bottom of the wall and with a horizontally oriented first surface mounted on the cabinets at a level for typing use;

(b) a vertically oriented first solid panel (19) mounted on the central divider by hinge means (22) so as to be unfoldable on a vertical axis into an open position at a 90° angle away from the wall and so as to be foldable on the vertical axis parallel to a line (2—2) between the ends of the wall;

(c) A vertically oriented second panel (21) mounted on the central divider by hinge means (23) so as to be unfoldable on a vertical axis into an open position at a 90° angle away from a line (2—2) between the ends of the central divider and so as to be foldable on the vertical axis parallel to the line between the ends; and (d) a second work surface (18) hinged on the first panel and held in place by a retaining means (29, 31, 32) such that when the work surface is folded the surface is parallel to the first panel and when in an open position is at about a 90° angle to the first panel.

SPECIFIC DESCRIPTION

Figure 2:
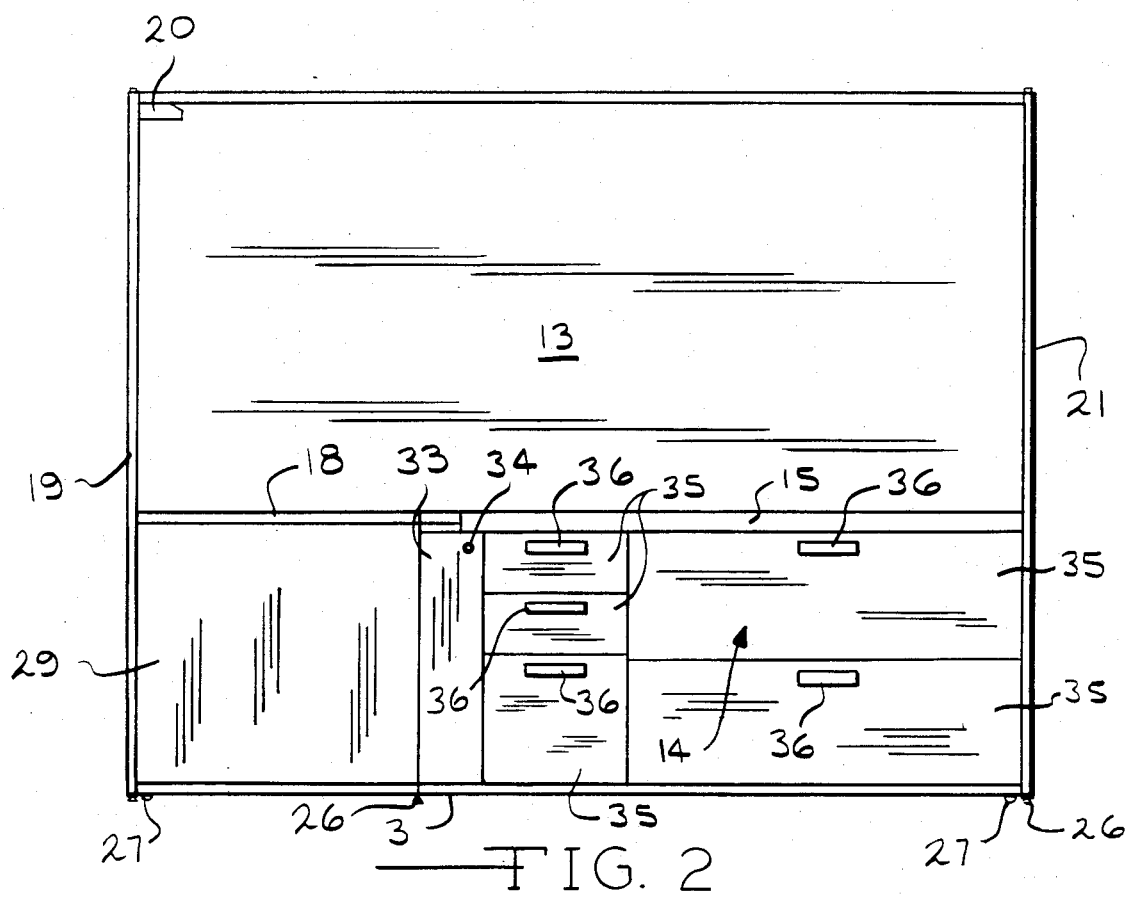
FIG. 2 is a front view of the modular unit of FIG. 1, particularly showing the positioning of first and second work surfaces (15 and 18) and a cabinet (14).
Figure 3:
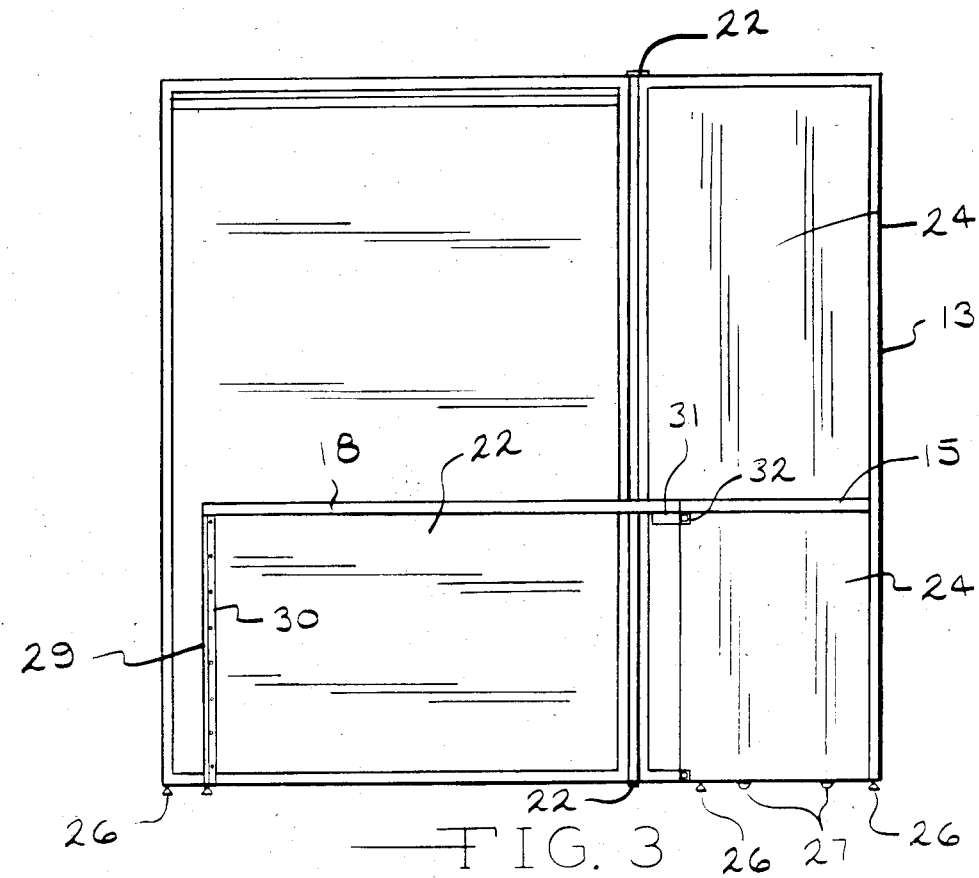
FIG. 3 is a right end sectional view of the unit (11) shown in FIG. 2 along line 3—3.
Figure 10:
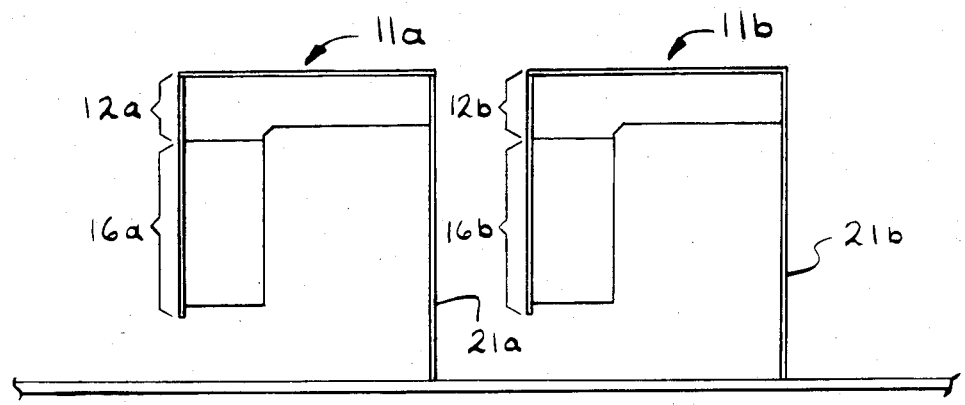
FIGS. 10, 11 and 12 are plan views of modular units joined together.
Figure 11:
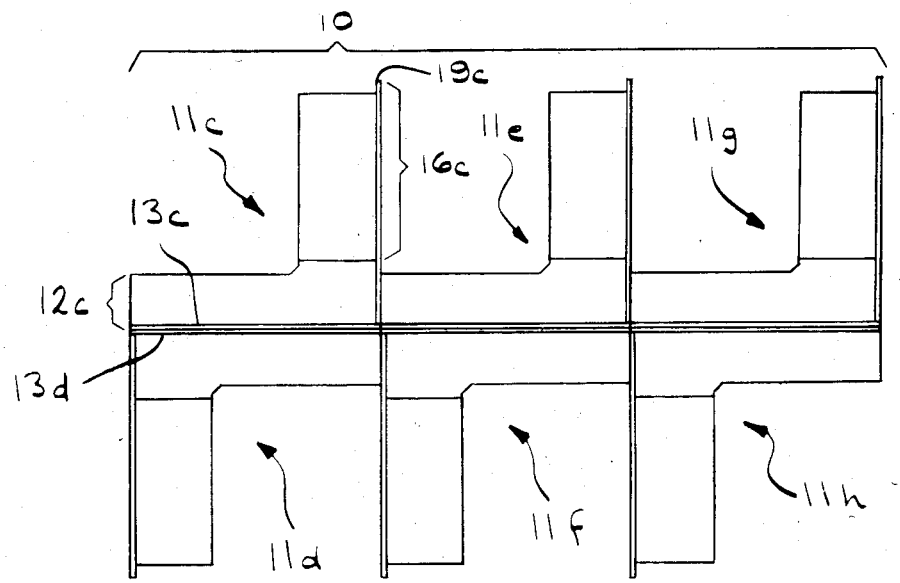
Figure 12:
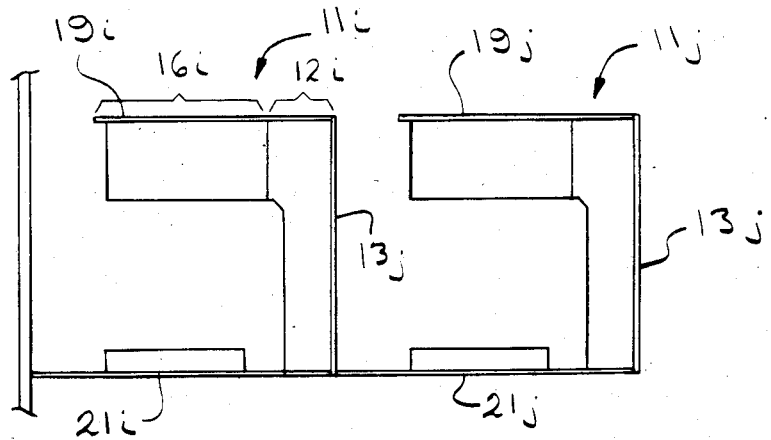

FIGS. 1 to 3 show an unfolded modular unit 11. FIGS. 7 to 9 show the folded modular unit. FIGS. 10 to 12 show the use of multiple modular units 11a to 11j. For reference purposes the lower case letters are used to designate identical elements on different units 11.

Each unit 11 includes a central divider 12 including a wall 13 and cabinet structures 14 each supporting a fixed first work surface 15 which is generally at a typing height. Each modular unit 11 includes a foldable section 16 on one side of the central divider 12. Each central divider 12 combined with foldable section 16 provides a work station 17. The foldable section 16 includes a second foldable work surface 18 adapted for typing use, supported by panel 29 and piano hinge 30. The walls 13 of the modular units 11 are positioned together back to back to form a modular system 10 in the embodiment shown in FIG. 11. The first panel 19 can mount a light 20 above the work surface 18. A light (not shown) can also be provided above the fixed work surface 15.

The unit 11 has a removable second panel 21 which is mounted on the central divider 12 by hinge means 23 so as to be unfoldable at a 90° angle away from the wall 13 and so as to be foldable on the vertical axis parallel to a line (2—2) between ends (13x and 13y) of the wall 13. Side closures 24 and 25 are used for mounting the first and second panels 19 and 21.

FIGS. 7 to 9 show the modular unit 11 in a folded configuration. The central divider 12 including the wall 13 is enclosed by the folded first and second panels 19 and 21 which are parallel to the wall 13. At the ends (13x and 13y) of the modular unit 11 are the side closures 24 and 25 perpendicular to the wall 13. The modular unit 11, preferably includes levelers 26 and lockable rollers or casters 27. FIGS. 2 and 3 show the unfolded modular unit 11 in more detail. As shown the second work surface 18 supported by a bracket or first retaining means including support 29 with a piano hinge 30 and by a pin latch 31 and 32. As shown the side closures 24 and 25 are provided with the hinges 22 and 23 which mount the panels 19 and 21. As shown in FIG. 2, the cabinet 14 includes sliding door 33 for access using finger recess 34 and drawers 35 with handles 36.

Figure 4:
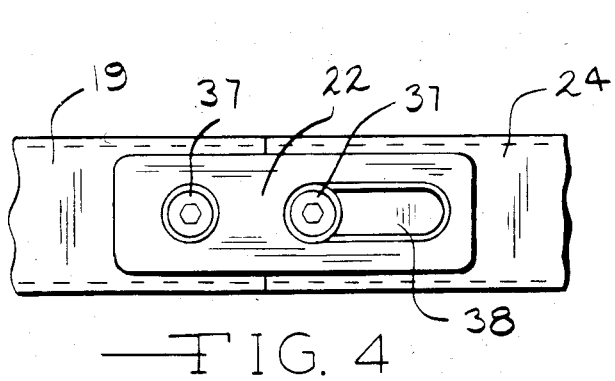
FIGS. 4 and 5 are plan views and FIG. 6 is a front view of the hinges (22 or 23) for the first and second panels (19 and 21).
Figure 5:
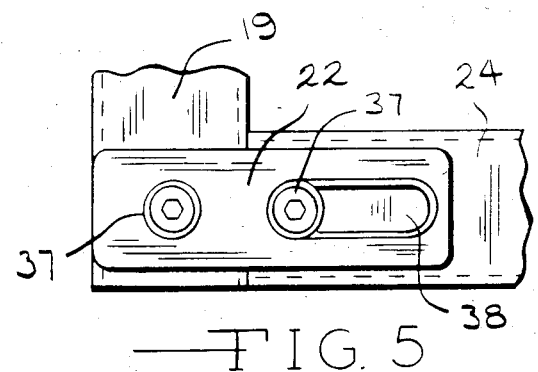
Figure 6:
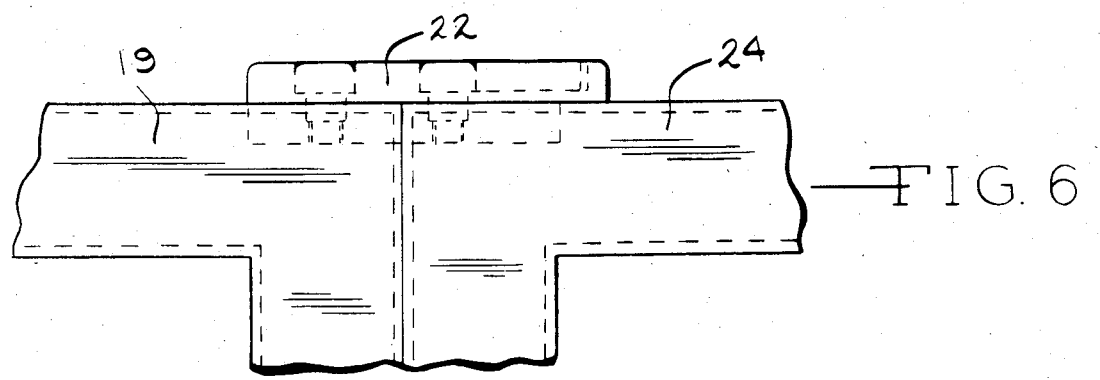

FIGS. 4, 5 and 6 show the details of hinges 22 (or 23). As can be seen threaded bolts 37 thread into panels 19 (or 21) and end closures 24 (or 25). The hinges 22 and 23 have a slot 38 so that the panels 19 and 21 can be folded and unfolded. The hinges 22 (or 23) are provided on the tops of the first and second panels 19 and 21 and on the bottoms (not shown) of the first and second panels 21. The bolts 37 are preferably loosened and tightened with conventional hexhead screwdrivers.

As can be seen the modular unit of the present invention for office use is a significant improvement over the prior art. The modular units provide considerable ease in opening, folding and repositioning which is an advantage.

I claim:

1. A portable and unfoldable first modular unit for office use positioned adjacent to another second modular unit to form the office or positioned adjacent a building wall to form the office with the building wall for providing work stations which comprises:
   (a) a central room divider including a solid vertically oriented first wall having opposite ends and
   (b) a vertically oriented panel mounted on one of the side closures by hinge means so as to be unfoldable on a vertical axis into an unfolded position at a 90° angle away from a horizontal line between the ends of the central room divider to provide the work station and so as to be foldable 90° on the vertical axis parallel to the horizontal line between the ends of the central room divider to a closed and folded position between the side closures and adjacent the work surface to enclose the cabinet, wherein the hinge means allows the panel to be moved parallel to the vertical axis away from the side closure for repositioning of the panel to the folded position and to allow the panel to be moved towards the side closure to abut against the side closure when unfolded in the open position so as to be continuous with the side closure to provide a second wall of the office and wherein the hinge means provides a square corner with the side closure in the closed and folded position and wherein the vertically oriented panel sides located between the ends and a top and a bottom, a cabinet structure on at least one side of and adjacent the bottom of the wall, side closures mounted at the ends of the central room divider perpendicular to the wall so as to enclose the opposite ends of the central room divider and with a horizontally oriented first work surface mounted on the cabinet on and between the side closures at a level for typing use; is positioned adjacent to the building wall to form the office or wherein the second modular unit with a second room divider, second end closures and second panel is positioned adjacent the first modular unit to form a third wall of the office; and
   (c) a second work surface hingedly mounted on the panel with a second hinge means on the second work surface and on the panel so that the second work surface is foldable upward and at a level for typing use when unfolded and with a retaining means engaging the panel and second work surface when the panel is unfolded.

2. The modular unit of claim 1 wherein in addition there are additional modular units with the first wall of each unit positioned in closely spaced relationship to the first wall of the first or second modular unit such that there are two work surfaces opposite each other.

3. The modular unit of claim 1 including lockable rollers mounted subadjacent the central room divider for movement of the unit when the casters are unlocked and for preventing movement of the unit when the rollers are locked.

4. The modular unit of claim 1 wherein the first and second modular units are provided with one of the side closures of each unit in closely spaced relationship.

5. The modular unit of claim 1 wherein at least one of the the side closures have a top surface and a bottom surface along the vertical axis and the panel has a top surface and a bottom surface along the vertical axis aligned with and adjacent to the top and bottom surfaces of one of the side closures, wherein the hinge means is a plate having a slot and mounted between one of the side closures and the panel on the top surfaces and on the bottom surfaces of the panel and side closure and the panel is movable on pins mounted parallel to the vertical axis on the top and bottom surfaces of the side closure or panel and through the slot in the plate of the hinge means and wherein the pins slide in the slot of the plate away from the side closure for repositioning of the panel in the folded and unfolded positions.

6. A portable and unfoldable first modular unit for office use positioned adjacent to another second modular unit to form the office or positioned adjacent a building wall to form the office with the building wall for providing work stations which comprises:
   (a) a central room divider including a solid vertically oriented first wall having opposite ends and sides located between the ends and a top and a bottom, with a cabinet on one side of and adjacent to the bottom of the wall, side closures mounted at the ends perpendicular to the wall so as to enclose opposite ends of the central room divider and with a horizontally oriented first work surface mounted on the cabinet on and between the side closures at a level for typing use;

(b) a vertically oriented first panel mounted on one of the side closures by first hinge means so as to be unfoldable on a vertical axis into an unfolded position at a 90° angle away from the wall and so as to be foldable on the vertical axis parallel to a line between the ends and along the first wall to a closed and folded position between the side closures and adjacent the work surface;

(c) a vertically oriented second panel mounted on the other of the side closures of the central room divider by second hinge means so as to be unfoldable on a vertical axis into an open position at a 90° angle away from a horizontal line between the ends of the central divider and so as to be foldable 90° on the vertical axis parallel to the horizontal line between the ends of the central room divider to a closed and folded position between the side closures and adjacent to the first panel to enclose the cabinet, wherein the first and second hinge means allow the first and second panels to be moved parallel to the vertical axis away from the side closure for repositioning of the panels to the folded position and to allow the first and second panels to be moved towards each of the side closures to abut against the side closure when unfolded in the open position so as to be be continuous with the side closure to provide second and third walls of the office, wherein the vertically oriented first or second panels or both panels are positioned adjacent to a building wall to form the office or wherein the second modular unit with a second room divider, second end closures and third or fourth panels are provided adjacent the first modular unit to form another wall of the office and wherein the first and second hinge means provide a squared corner with the side closure when in the closed and folded position; and (d) a second work surface with a third hinge means on the second work surface and on the panel and held by a first retaining means engaging the second work surface in an unfolded position such that when the second work surface is folded the surface is parallel to the first panel and when the second work surface is in the unfolded position the second work surface is at about a 90° angle to the first panel.

7. The modular unit of claim 6 wherein the central room divider is mounted on subadjacent rollers to provide for rolling movement of the modular unit.

8. The modular unit of claim 7 wherein the rollers are lockable and are used to prevent rolling when the first and second panels and the second work surface are in unfolded positions and wherein the first and second panels have height adjustable floor supports for holding the panels in place when they are in the open position.

9. The modular unit of claim 6 linked with at least one additional modular unit.

10. The modular unit of claim 6 wherein the side closures have a top surface and bottom surface and the first and second panels have a top surface and a bottom surface along the vertical axis aligned with and adjacent to the top and bottom surfaces of the side closures, wherein the hinge means is a plate having a slot and mounted between each of the side closures and the panels on the top surfaces and on the bottom surfaces of the panels and side closures and the first and second panels are movable on pins mounted parallel to the vertical aixs on the top and bottom surfaces of the side closures or panels through the slot in the plate of the hinge means and wherein the pins slide in the slot of the plate away from the side closure for repositioning of the panel in the folded and unfolded positions.

* * * * *